US006890410B2

(12) United States Patent
Sullivan

(10) Patent No.: US 6,890,410 B2
(45) Date of Patent: May 10, 2005

(54) APPARATUS FOR CONVERTING A FLUID INTO AT LEAST TWO GASSES THROUGH ELECTROLYSIS

(76) Inventor: John T. Sullivan, 11339 Barley Field Way, Marriottsville, MD (US) 21104

( * ) Notice: Subject to any disclaimer, the term of this patent is extended or adjusted under 35 U.S.C. 154(b) by 199 days.

(21) Appl. No.: 10/314,987

(22) Filed: Dec. 10, 2002

(65) Prior Publication Data

US 2004/0108203 A1 Jun. 10, 2004

(51) Int. Cl.[7] ............................. C25B 9/00; C25B 13/00
(52) U.S. Cl. ........................ 204/258; 204/260; 204/266; 204/282
(58) Field of Search ................................. 204/256, 258, 204/263, 265, 266, 284, 282, 260

(56) References Cited

U.S. PATENT DOCUMENTS

| | | | | |
|---|---|---|---|---|
| 1,172,932 A | * | 2/1916 | Bucknam | 204/258 |
| 1,495,681 A | * | 5/1924 | Fauser | 204/258 |
| 1,942,208 A | * | 1/1934 | Gamichon | 204/216 |
| 3,883,415 A | * | 5/1975 | Shibata et al. | 204/258 |
| 3,930,151 A | * | 12/1975 | Shibata et al. | 204/258 |
| 4,201,653 A | * | 5/1980 | O'Neill et al. | 204/263 |
| 4,605,498 A | | 8/1986 | Kulish | |
| 6,007,742 A | | 12/1999 | Czernichowski et al. | |
| 6,080,290 A | | 6/2000 | Stuart et al. | |
| 6,103,411 A | | 8/2000 | Matsubayashi et al. | |
| 6,126,794 A | | 10/2000 | Chambers | |
| 6,395,154 B1 | | 5/2002 | Stuart et al. | |
| 2001/0045364 A1 | | 11/2001 | Hockaday et al. | |

* cited by examiner

*Primary Examiner*—Donald R. Valentine
(74) *Attorney, Agent, or Firm*—Diller, Ramik & Wight

(57) ABSTRACT

An electrolysis conversion system for converting liquid to gas, such as water into hydrogen and oxygen, includes a housing in which are housed encapsulated and non-encapsulated electrodes in any one of side-by-side, rolled or folded relationship. The electrodes are immersed in an electrolyte, water or the like and are appropriately electrically connected to positive and negative sides of an energy source. The encapsulation material of the encapsulated electrodes can be substantially conductive or non-conductive to either ion flow or electron flow and either substantially non-porous or porous to gas bubbles with the option of utilizing spacers to prevent arcing and thereby generate hydrogen and oxygen from the water/electrolyte. The encapsulating media is either a folded flexible sheet heat sealed along three edges, two sheets heat sealed along four edges, a tube heat sealed along opposite axial edges or a coating dip-coated, electro-deposited, silk screen coated or similarly applied to the electrode which is preferably porous and can either be rigid or relatively bendable/flexible.

80 Claims, 11 Drawing Sheets

FIG. 8
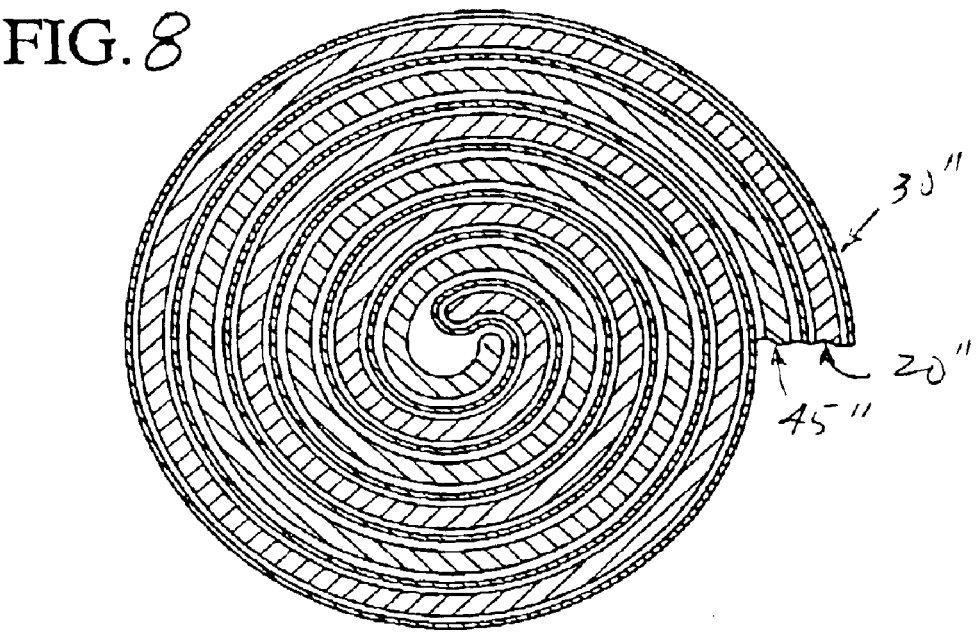
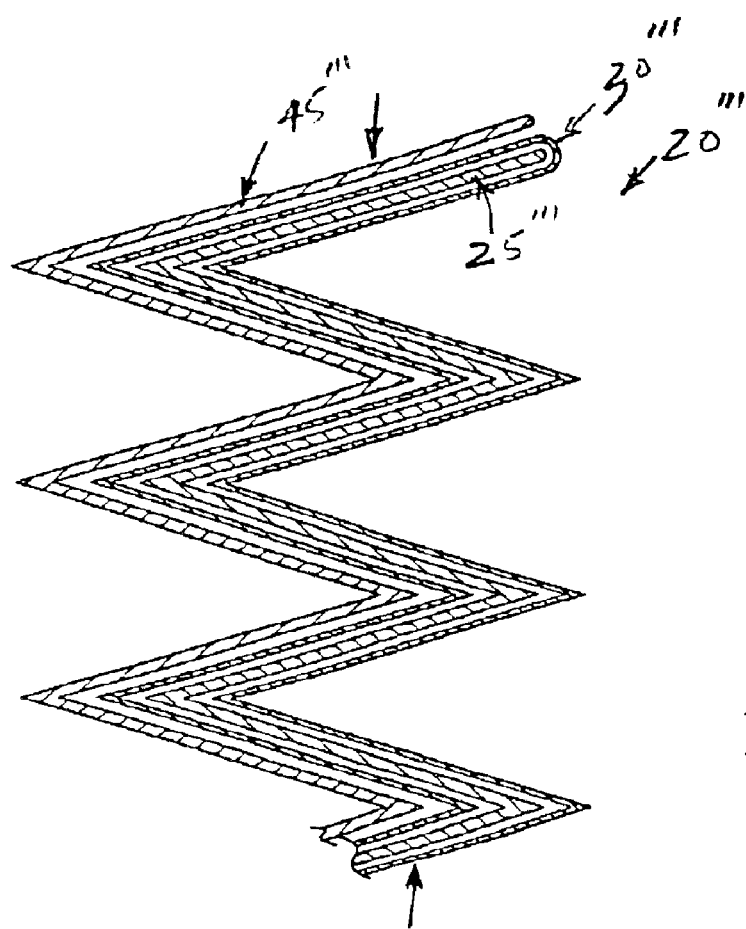
FIG. 9

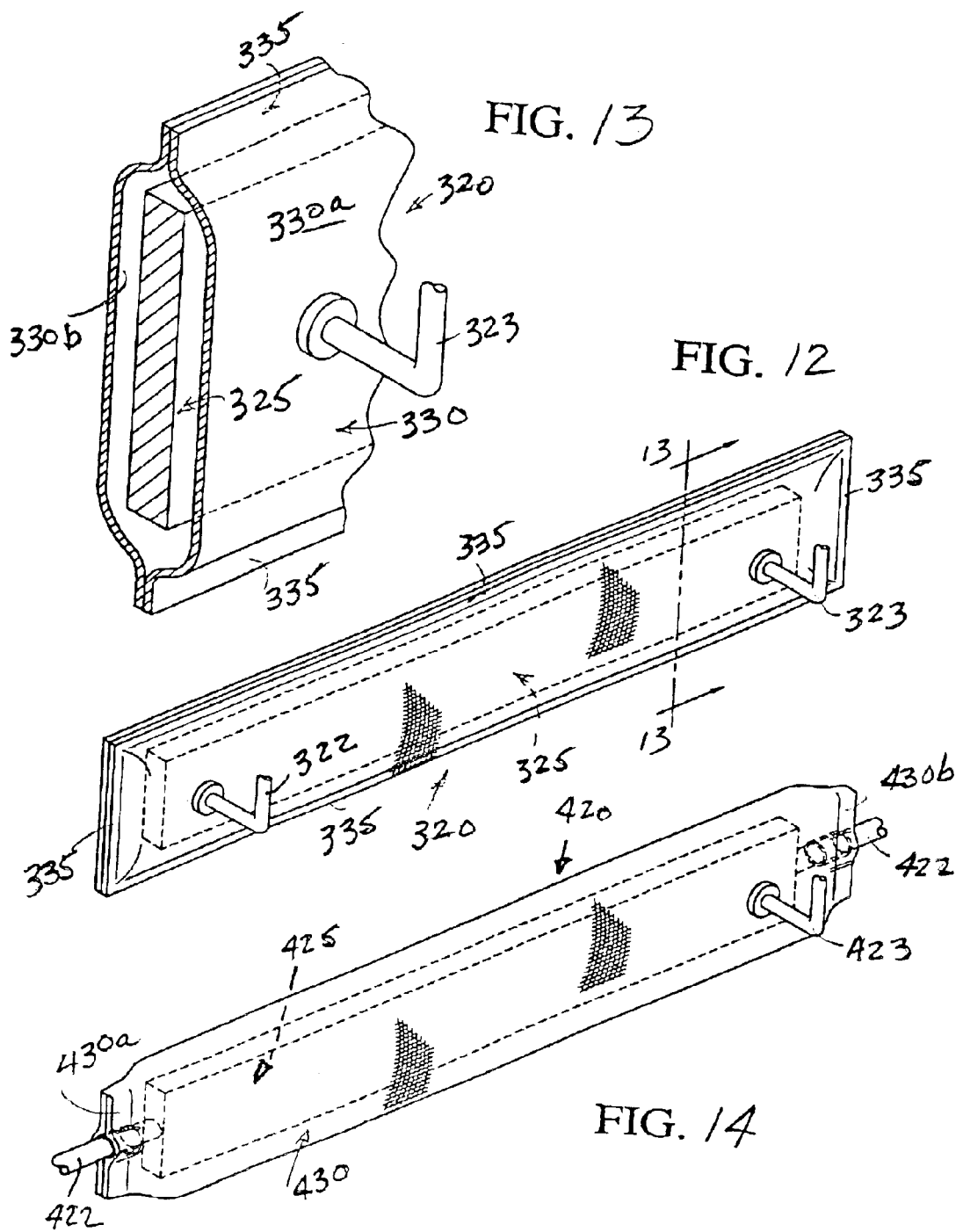

APPARATUS FOR CONVERTING A FLUID INTO AT LEAST TWO GASSES THROUGH ELECTROLYSIS

BACKGROUND OF THE INVENTION

The present invention is directed to an apparatus for converting a fluid into at least two gasses through electrolysis, and more specifically to an apparatus for producing hydrogen and oxygen from water with or without a catalyst. In lieu of utilizing water as the fluid, other fluids, additives and/or catalysts can be provided to generate gasses other than hydrogen and oxygen.

1. Field of the Invention

The field of the invention is an apparatus for converting a fluid into at least two gasses.

2. Description of Related Art

A conventional electrolysis cell for producing hydrogen and oxygen from water is disclosed in U.S. Pat. No. 6,126,794 issued on Oct. 3, 2000. This patent describes a conventional electrolysis cell as including two electrodes arranged within the cell which apply energy to the water to thereby produce hydrogen and oxygen, but the generation of the latter is said to be inefficient, requires a large amount of electrical power, and uses a chemical catalyst, such as a sodium hydroxide or potassium hydroxide. Excessive heating and the tendency of hydrogen and oxygen bubbles to bunch around or on the electrodes which create electrical insulation are additional problems recognized in this patent.

The patent suggests solutions to these problems, such as minimizing the spacing between adjacent electrodes (1 mm), utilizing first and second power sources of different frequencies with one power source providing a pulsed square-wave form signal, etc. The patent actually adds complexity to what on the surface is a simple chemical reaction which heretofore necessitated the utilization of complex apparatuses requiring the use of expensive materials, numerous parts, painstaking assembly (stacked and bolted components), excessive weight per gas generated, etc. The patent also fails to address immediately separating the gasses, be they hydrogen and oxygen or otherwise, upon generation thereof in order to be individually immediately utilized as a power source for internal combustion engines, stoves, furnaces, or the like.

The assignee of this patent (Xogen Power Inc.) at its web site (http://tathacus.msystems.net/XogenFAQ.php) states its research "discovered a breakthrough Technology that separates water into usable hydrogen and oxygen with a modest electrical input," yet provides no information and instead states "the specific details of the Technology are proprietary to Xogen Power Inc. and are subject to the strictest confidentiality." As in the case of many other more well known corporations, efficient electrolysis production units manufactured at reasonable cost and sold at reasonable price to consumers are not to be found in today's marketplace and "may be engineered and manufactured in the future." (See latter-quoted web site.)

The present state of the art and the high cost associated with the manufacture and sale of the "Small Hydrogen Generators with Electrolysis" is self-evident from another web site (http://www.stuartenergy.com/hydrogen/-splatform.asp). "Stuart's smallest stack is the S-Series platform. The S platform can generate any volume of hydrogen below 5 $Nm^3$ per hour. The S-platform is used in our industrial meteorological products, the MET unit, and in our Personal Fuel Appliance prototype (PFA). The PFA is designed to meet the fuel needs of up to 5 efficient fuel cell vehicles." The hydrogen generated is extremely low and unmentioned is the high ratio of platform weight to volume of hydrogen generated and the high cost of any of these electrolysis units.

SUMMARY OF THE INVENTION

It is an object of the present invention to provide an electrolysis apparatus which is extremely inexpensive to manufacture, significantly reduces anode/cathode arcing is relatively lightweight, and produces separate gasses which can be individually immediately utilized and/or stored and accomplish the latter at low power input and low overall total cost.

The primary object of the invention latter-stated is realized by an electrolysis apparatus which includes a novel encapsulation system for electrodes (anode or cathode) which allows oppositely charged electrodes to be placed into intimate contiguous relationship with each other to thereby increase ion conduction or flow or electron conduction or flow and correspondingly increase the generation of gasses. The encapsulation system is preferably a sheet of flexible material which is folded along one edge to completely encapsulate an electrode therein and remaining edges of the envelope are sealed to each other. A fluid delivery tube, which can also be an electrical conductor, has an end located in the electrode of the encapsulation envelope for introducing fluid therein, such as water with or without an additive electrolyte, and communicating generated gas bubbles to an exterior source of utilization or storage. A rod at an end of the electrode opposite the tube also has an end passed through the encapsulation envelope for conducting power to/through the electrode, and both the rod and the tube serve as supports for the encapsulate electrode in the overall apparatus/electrolyzer. The material of the encapsulating envelope is either substantially electrically conductive or substantially non-conductive. In one embodiment of the invention the encapsulation material is substantially impervious to gas bubbles but "porous" or conductive to electron flow and in a second embodiment the encapsulation material is substantially electro-chemically conductive to ion flow (Proton Exchange Membrane—PEM) and non-porous to gas bubbles. Therefore, when a plurality of the encapsulated electrodes and non-encapsulated electrodes of different polarities are placed in alternating side-by-side intimate contacting relationship to each other within a container or vessel containing fluid and like fluid is introduced into the encapsulation envelopes and the electrodes are appropriately energized, one of either ions/protons or electrons flow between the cathodes and anodes absent arcing therebetween while the generated gas bubbles are confined within each encapsulation envelope and container. The identical gas in each encapsulation envelope bubbles through the fluid therein and is directed to the source of utilization or storage by the aforementioned tubes while the gas is in the container, obviously differing from the gas in the encapsulation envelopes, is likewise collected by another tube and is delivered to a different source of utilization or storage. Thus, through the utilization of an encapsulating medium which can be substantially porous or non-porous, substantially electrically non-conductive or electrically conductive or electro-chemically conductive, highly efficient low cost fluid/liquid-to-gas electrolysis is provided by the present invention.

In further keeping with this invention, the encapsulated electrode is preferably constructed from highly conductive solid, porous, rigid or flexible metallic material, such as stainless steel or nickel or platinum-coated steel, and in lieu of a number of individual side-by-side stacked encapsulated/non-encapsulated electrodes or electrode couples, the electrode couple can be in the form of a roll, spiral, fan-folded and flattened. or formed to virtually any configuration desired or to accommodate a particular electrolysis system or installation.

In lieu of the utilization of a separate flexible sheet of material forming the encapsulation system or encapsulation envelope of the invention, the electrode (anode or cathode) is provided with a coating of encapsulating material which is substantially identical to that of the sheet of encapsulation material heretofore described. The encapsulating material coating may be conventionally sprayed, dipped, electrodeposited or similarly conventionally applied to an electrode to completely and intimately adhere to all exterior surfaces thereof and to at least a portion of a fluid inlet/gas bubble outlet/electrically conductive pipe and/or a support pipe/support conductor having ends in or connected to the electrode. Such an encapsulating coating functions as aforesaid with respect to the encapsulating envelope and the electrode encapsulated thereby and can be utilized in alternating cathode/anode side-by-side arrangements, spiral, folded or equivalent systems.

In further keeping with the present invention, the electrode which is encapsulated by the encapsulating means, be it in the form of an envelope or a coating, is also preferably constructed from porous material, such as porous sintered steel and an end of the fluid inlet/gas bubble outlet pipe having numerous perforations therein is totally housed in the electrode. Fluid within the pores or interstices of the porous electrode is changed into gas bubbles which pass through the perforations or apertures of the pipe and bubble upwardly therethrough to an area of utilization or storage while at the same time the fluid within the pipe continually refills or refreshes the interstices or pores to create ongoing rapid and efficient generation of gas bubbles.

In further accordance of the invention, the apparatus described is equally operative in all examples provided in conjunction with encapsulating means which are substantially electrically or electro-chemically conductive, substantially conductive to electrons and substantially non-porous to gas bubbles or non-porous to gas and electro-chemically conductive to electron passage. However, in the case of related highly conductive encapsulating means, the latter must be insulated from its immediately most adjacent unencapsulated electrode. Accordingly, in keeping with the present invention in which the encapsulating means is constructed from substantially electrically conductive material, insulating means are provided to electrically insulate each non-encapsulated electrode from encapsulated electrodes at either or both sides thereof. The insulating means might be, for example, an open frame of insulating material located along the peripheral edge of opposite sides of an electrode which is sandwiched between two encapsulated electrodes which creates a space therebetween of a sufficient depth to prevent arcing yet permit the free flow of ions or electrons. Alternatively, a "frame" of insulating material can be coated, electro-deposited, or otherwise applied to opposite sides of the particular non-encapsulated electrode sandwiched between a pair of encapsulated electrodes or vice versa in a series of alternating electrodes to thereby form an electrolysis system operative in conjunction with a conductive encapsulation.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 8 is a fragmentary cross-sectional view taken normal to the axis of the rolled electrode couple of FIG. 7, and illustrates details thereof.

FIG. 9 is a schematic fragmentary view similar to FIG. 8, and illustrates an encapsulated and a non-encapsulated electrode in fan-folded relationship in lieu of being rolled (FIG. 8) or stacked (FIG. 2).

FIG. 12 is a perspective view of another encapsulation system constructed in accordance with this invention, and illustrates an electrode, a fluid inlet/gas bubble outlet tube connected to one end of the electrode and an electrical conductor/support connected to an opposite end of the electrode, and encapsulation means in the form of a pair of sheets forming an encapsulation envelope heat sealed along four edges thereof.

FIG. 13 is an enlarged fragmentary cross-sectional view taken generally along line 13—13 of FIG. 12, and illustrates details of the porous nature of the electrode and the manner in which the electrical conductor/support tubes connects to a side of the electrode.

FIG. 14 is a perspective view of another encapsulation system constructed in accordance with this invention, and illustrates an electrode encapsulated in tubular encapsulation means in the form of a injection molded, blow molded or extruded tube or tubular envelope heat sealed at opposite axial ends.

DESCRIPTION OF THE PREFERRED EMBODIMENTS

Figure 2:
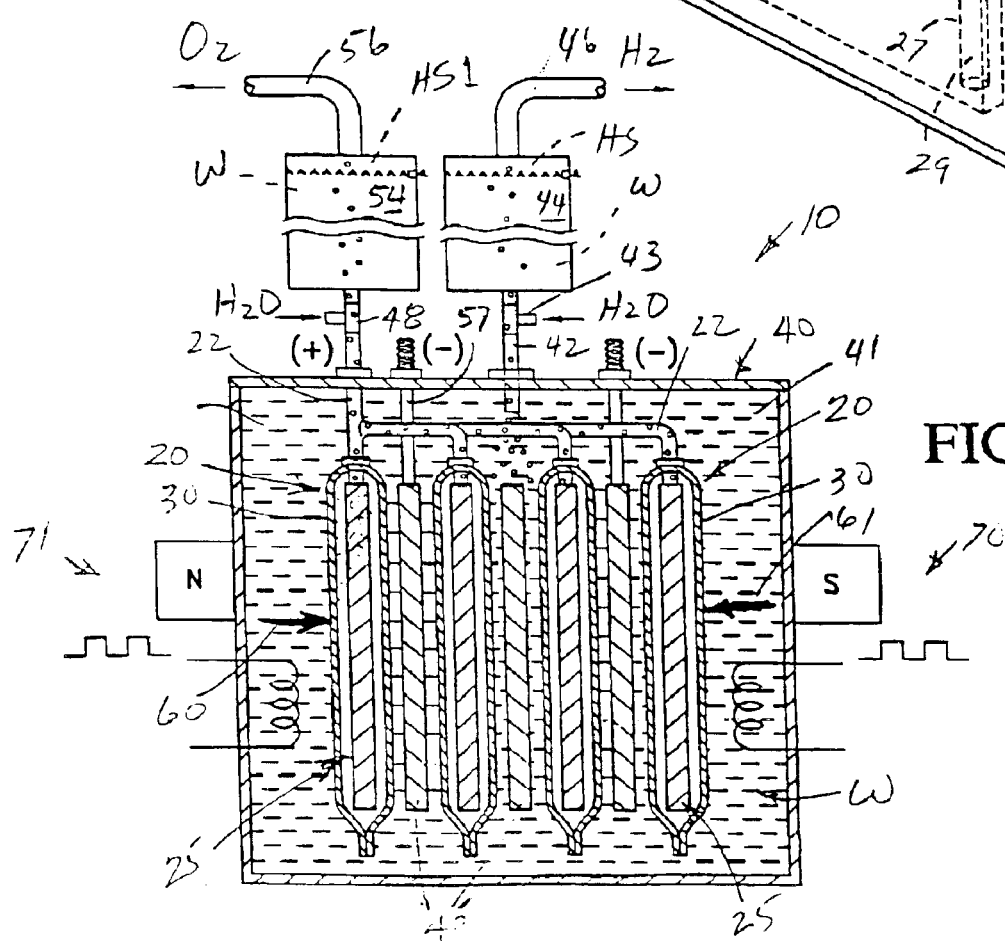
FIG. 2 is a highly diagrammatic cross-sectional view of an apparatus for converting a fluid into at least two gasses utilizing a plurality of the encapsulated electrodes of FIG. 1, and illustrates four such encapsulated electrodes alternating and sandwiching between pairs thereof non-encapsulated electrodes, water within the encapsulation envelopes within a housing for all the electrodes, and a source of electric current which is passed between the electrodes through conduction, electron porosity or electro-chemical conductivity to form hydrogen gas and oxygen gas at the respective negative and positive electrodes which can be immediately utilized and/or stored.

A novel liquid-to-gas electrolysis conversion system or apparatus for converting a fluid/liquid into at least two gasses, such as converting water into hydrogen and oxygen, through electrolysis is shown in FIG. 2 and is generally designated by the reference numeral 10.

A major aspect of the present invention involves the construction of a novel electrode encapsulation system 20 (FIG. 1) in the form of either an encapsulated anode or an encapsulated cathode, depending upon the manner in which current is connected to and flows therethrough.

The electrode encapsulation system or encapsulated electrode 20 is defined by a porous electrode 25 (FIG. 3) and a substantially polygonal/rectangular sheet 30 (FIG. 4) of relatively flexible material.

The porous electrode 25 is preferably constructed from electrically conductive sintered stainless steel or sintered nickel, but if made of solid electrically conductive material, such as solid stainless steel, the same is preferably electro-coated with platinum or other such highly conductive metallic material. The electrode 25 is relatively long, as compared to its width and height, and at opposite ends thereof includes cylindrical bores 26, 27 (FIG. 1) which are in generally parallel relationship to each other. Housed within the bores 26, 27 are a perforated end 28 of a respective hollow tube 22 of highly conductive metallic material and an end 29 of a solid rod 23 of similar conductive material. Electrically insulating sleeves 24 electrically insulate the tube 22 and the rod or support 23 from the flexible sheet 30 (FIG. 4) when folded to form an envelope 30 (FIGS. 1 and 3) therefrom, as will be apparent immediately hereinafter.

Figure 1:
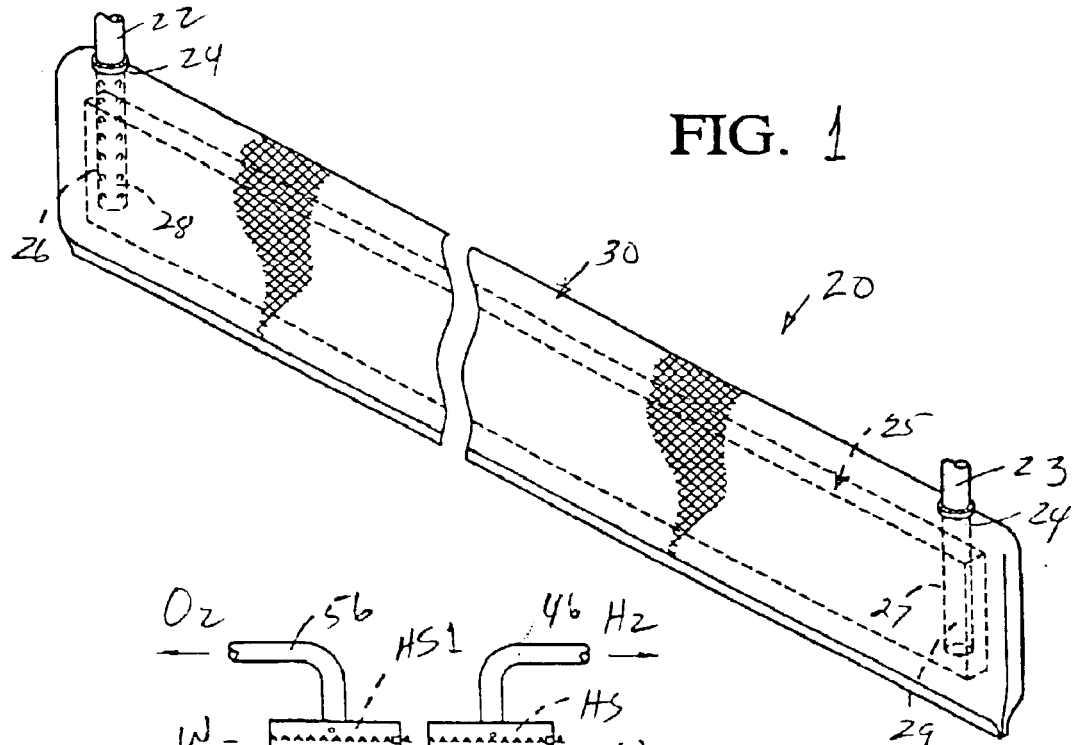
FIG. 1 is a perspective view of an encapsulation system constructed in accordance with this invention, and illustrates an electrode, a fluid inlet/gas bubble outlet tube connected to one end of the electrode, an electrical conductor/support connected to an opposite end of the electrode, and encapsulating means in the form of a folded sheet or envelope having three heat sealed sides formed of any of the encapsulating materials heretofore described.

The flexible sheet 30 includes opposite substantially parallel short end edges 31, 32 and substantially parallel long side edges 33, 34 substantially equally spaced from a longitudinal center line 35 along which and adjacent opposite edges 31, 32 are formed respective holes or openings 36, 37. The insulators 24 are seated in and are bonded to the edges (unnumbered) of the holes 36, 37 and thereby maintain the tube 22 and the support rod 23 electrically insulated from the sheet 30 which is folded along the center line 35 to form a longitudinal fold 39 (FIG. 1). The edge 31 is heat sealed to itself. The edge 32 is heat sealed to itself. The edges 33, 34 are heat sealed to each other thereby transforming the flexible sheet 30 into the flexible envelope(s) 30 of FIGS. 1 and 2.

The purpose of the flexible sheet/envelope 30 is to function as a separator for the encapsulated electrodes 20 in the apparatus 10 in association with a multiplicity of non-encapsulated electrodes 45, as will be described hereinafter. The choice of material of construction of the sheet/envelope 30 will depend upon the choice of electrical conductivity or electro-chemical conductivity taking place in the apparatus 10. The sheet/envelope 30 is preferably non-porous to liquid, electrolyte and/or generated gas bubbles and electrically non-conductive or mildly electrically conductive for electro-chemically conductive systems used for applications in which the electro-chemical reactions are prone to producing chemical gradients in the electrolyte circulation system, e.g., $H_2$ and $O_2$ in the case of water electrolyzers, as is the primary intent of the present invention. However, the sheet/envelope 30 could also be porous to permit electrolyte to cross back and forth through the sheet/envelope 30 between the anode and cathode compartments to reduce concentration gradients, yet inhibit the electro-chemical products (hydrogen and oxygen) produced in respective compartments from crossing. The use of materials characterized by sufficient porosity to permit electrolyte mixing but prevent excessive product mixing avoids the need for special electrolyte mixing systems added on or to the electrolyzer. This is a significant improvement over known electro-chemical systems which incorporate low porosity separators, such as asbestos, which require equipment to mix the anolyte and catholyte. However, for alkaline water electrolysis which can also be performed in accordance with this invention, the sheet/envelope 30 is also preferably porous but is fabricated from the material such a polyphenylene sulfide or other similar electrolyte resistant materials which may be surface treated to reduce the inter-electrode resistance and reduce gas permeability and achieve electrolysis through electro-chemical conductivity (ion/proton conductivity). One specific material from which the sheet/envelope 30 can be constructed in a microporous tri-layer membrane formed by one polyethylene layer between two polypropylene layers which is sold under the name Celgard® 2340 Microporous Membrane by Calgard, Inc. of 13800 South Lakes Drive, Charlotte, N.C. 28273. The latter material is substantially non-electrically conductive and the porosity thereof permits gas bubbles to pass therethrough while preventing flow therethrough of water/electrolyte.

Figure 3:
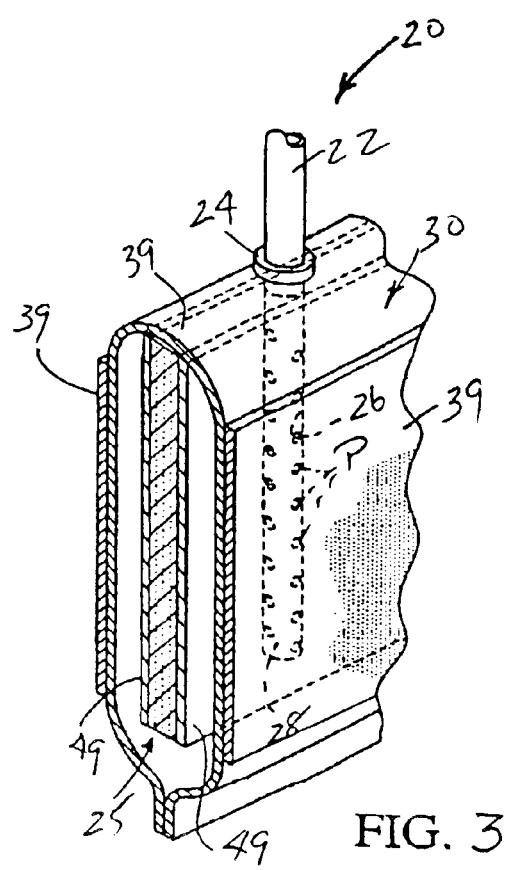
FIG. 3 is an enlarged transverse cross-sectional view taken through the encapsulated electrode of FIG. 1, and illustrates the porous nature of the electrode, the envelope folded along an upper edge and heat sealed along a lower edge thereof, a plurality of perforations in an end of the fluid inlet/gas bubble outlet tube, and catalyst coatings on surfaces of the electrode and the envelope.

In another embodiment of the invention, the sheet/envelope 30 is non-porous to gasses and is mildly electrically conductive but relies upon long ionic chains, not electron conductivity, most often of sulfonic acid groups, for transmitting gasses through the sheet/envelope 30. One such material is Nafion® membrane, which is a Proton Exchange Membrane or PEM, manufactured by Dupont Chemical Co. of Wilmington, Del. under a variety of types, thicknesses and calibers, such as N-111$^2$, N-112, etc. The Nafion® 100 series membranes are sulfonate films that are typically used for $H_2O$ and HCl electrolysis and fuel cells, and can be used as the material from which is constructed the sheet/envelope 30. The Nafion® envelope 30 preferably include catalyst coatings 39, 39 of platinum and the electrode 25 preferably includes catalyst coatings of irridium 49, 49 or other suitable catalyst materials to enhance electro-chemical reaction thereby increasing the efficiency of the electrolysis and the generation of hydrogen and oxygen thereby. The catalyst coatings 39, 39 are preferably applied to the sheet 30 during the fabrication of the latter, and the catalyst coatings 49, 49 are similarly electro-deposited, coated or otherwise suitably applied to exterior surfaces of the electrode 25 (FIG. 3). The catalyst coatings 39, 39; 49, 49 promote the disassociation of hydrogen (H2) at the anode by readily transporting or conducting the hydrogen ions ($H^+$).

The apparatus 10 (FIG. 2) includes means 40 of a conventional construction for defining a chamber 41 adapted to house a fluid or liquid, such as water W which is delivered into the chamber 41 through a conduit 42 which includes a T-coupling or fitting 43. An appropriate reservoir 44 connected to the T-coupling 43 also includes water W therein above an upper level of which is head space HS from which gas (hydrogen gas, for example) can be delivered through a conduit 46 to a utilization source, such as a diesel engine or to storage.

Merely as exemplary, there are four encapsulated electrodes 20 housed within the chamber 41 of the housing 40 and between each of the encapsulated electrodes 20 there is a conventional non-encapsulated electrode 45 which, for example, could correspond to the electrode 25 absent any of the encapsulation means 30 heretofore described. The non-encapsulated electrodes 45 are connected to the negative side of the conventional current source. The conduits or tubes 22 of all of the encapsulated electrodes 20 are connected to each other and are connected to a positive side of a conventional current source, while the opposite ends of each of the encapsulated electrodes 20 are suitably supported from the housing 40 through the connectors 23 (FIG. 1). The conduits or tubes 22 and the conductors/supports 23 are suitably electrically insulated relative to the housing 40 and the encapsulating envelopes 30. A T-fitting or coupling 48 functions to introduce water via the tubes 22 into each of the encapsulation envelopes 30 and is connected to the positive side of a conventional current source, thereby creating oxygen at each of the positive electrodes 25 in the form of gas bubbles which enter the ends 28 of the tubes 22 through perforations P and rise upwardly into and through a tank 54 collecting in a head space HS1 from which they are directly utilized or stored via a conduit 56.

The electrodes 45 are conventionally supported at opposite ends thereof by support rods 57 much in the same manner as each electrode 25 has connected thereto the tube 22 and the support 23, and the supports 57 are also electrically insulated in a conventional manner relative to the housing 40.

Though the encapsulated electrodes 30 and the unencapsulated electrodes 45 are illustrated in spaced relationship to the encapsulation envelopes 30, it is to be understood that electrically non-conductive springs, clamping mechanisms, or the like, are utilized to force the electrodes 20, 45 and the encapsulation envelopes 30 into contiguous, intimate, face-to-face, abutting relationship along all mutually abutting surfaces thereof. The headed arrows designated by the reference characters 60, 61 are intended to diagrammatically depict any conventional structures for applying forces to hold the electrodes 20, 45 and the encapsulation envelopes 30 in such intimate contiguous relationship.

During typical water electrolysis, hydrogen gas ($H_2$) is formed at the negative electrodes 45 while oxygen ($O_2$) is formed at the positive electrodes 25. The gas bubbles of the hydrogen and oxygen rise, enter the respective reservoirs or storage tanks 44, 54, respectively, enter the respective head spaced HS, HS1, and are thereafter conducted via the conduits 46, 56, respectively, to sources of permanent storage (tanks) or immediate utilization (diesel engines).

Energy efficiency of the overall liquid-to-gas electrolysis system 10 and more specifically the electrode encapsulation system 20 is effected by reducing the voltage required to pass the current between the electrodes 25, 45. This is accomplished by reducing the resistance to current flow through the nature of the flexible sheet 30, the high surface-to-surface contact between the latter and the electrodes 25, 45, the intimate spacing between the electrodes 25, 45 due to the nature of the flexible sheet 30, and where desired or found necessary, the utilization of more conductive internal current pass by using materials capable of accepting higher operating temperatures whether the flexible material 30 be porous or non-porous. The latter achieves efficiencies well beyond the 90 percent current efficiency claimed to date, as measured on the basis of electricity input to hydrogen generation. Therefore, electrolytically produced hydrogen per the present invention can be employed on an as-produced basis for, as an example, injection with diesel fuel immediately into combustion chambers of diesel engines, particularly for today's eighteen wheelers, to obtain increased mileage efficiencies, and reductions in air pollutants.

In further accordance with the invention, one or more magnetic coils 70, 71, for example, or equivalent means are provided to release gas bubbles from the electrodes 25, 45. Alternatives to the magnetic coils 70, 71 could include high frequency and/or ultrasonic generators of a conventional construction, such as piezoelectric crystal transducers of substantially 20,000 Kh (ultrasonic range). Also, by generating a strong enough flux field through the magnetic coils 70, 71 the hydrogen can be changed from its exceedingly unstable orthohydrogen state to its stable parahydrogen counterpart.

Figure 5:
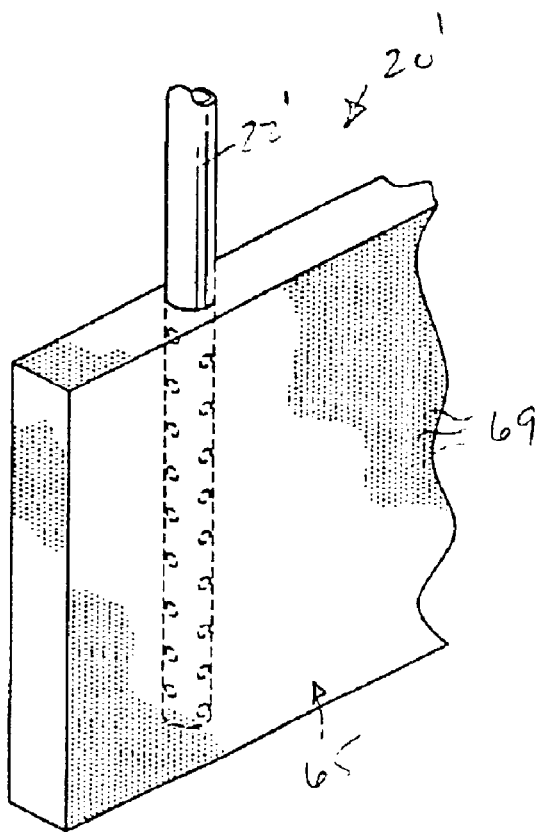
FIG. 5 is a fragmentary side elevational view of another encapsulated electrode of the present invention, and illustrates a porous electrode encapsulated by an encapsulation envelope corresponding to that of FIGS. 1 through 3 but applied to the electrode by dip coating, spray coated, electro-deposition, screen printing or the like, and a fluid inlet/gas bubble outlet having an apertured or perforated end within the electrode.
Figure 6:
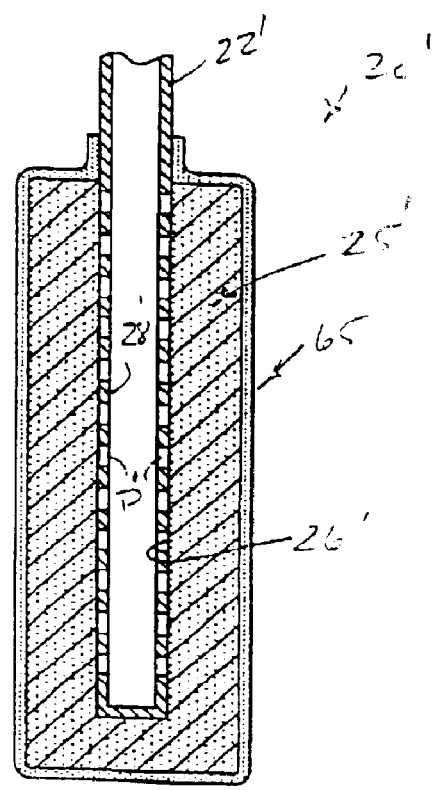
FIG. 6 is an enlarged fragmentary cross-sectional view of the encapsulated electrode of FIG. 5, and illustrates specific details thereof.

In lieu of the encapsulated electrode 20 of FIG. 1, another encapsulated electrode 20' is illustrated in FIGS. 5 and 6 of the drawings and components thereof identical to those of the encapsulated electrode 20 bear identical reference characters which are primed, such as a sintered porous metal electrode 25', a conduit or tube 22' having an end 28' with openings or perforations P' housed in a cylindrical bore 26' of the electrode 25' and encapsulation means 65 which is made of the same material as the encapsulation sheet 30 heretofore described except the same is dip-coated, electrostatically deposited, screen printed, or otherwise applied to the electrode 25' such that the encapsulated electrode 20' can be utilized in the apparatus 10 in lieu of the encapsulated electrodes 20 in the manner heretofore described with respect to FIG. 2.

Figure 7:
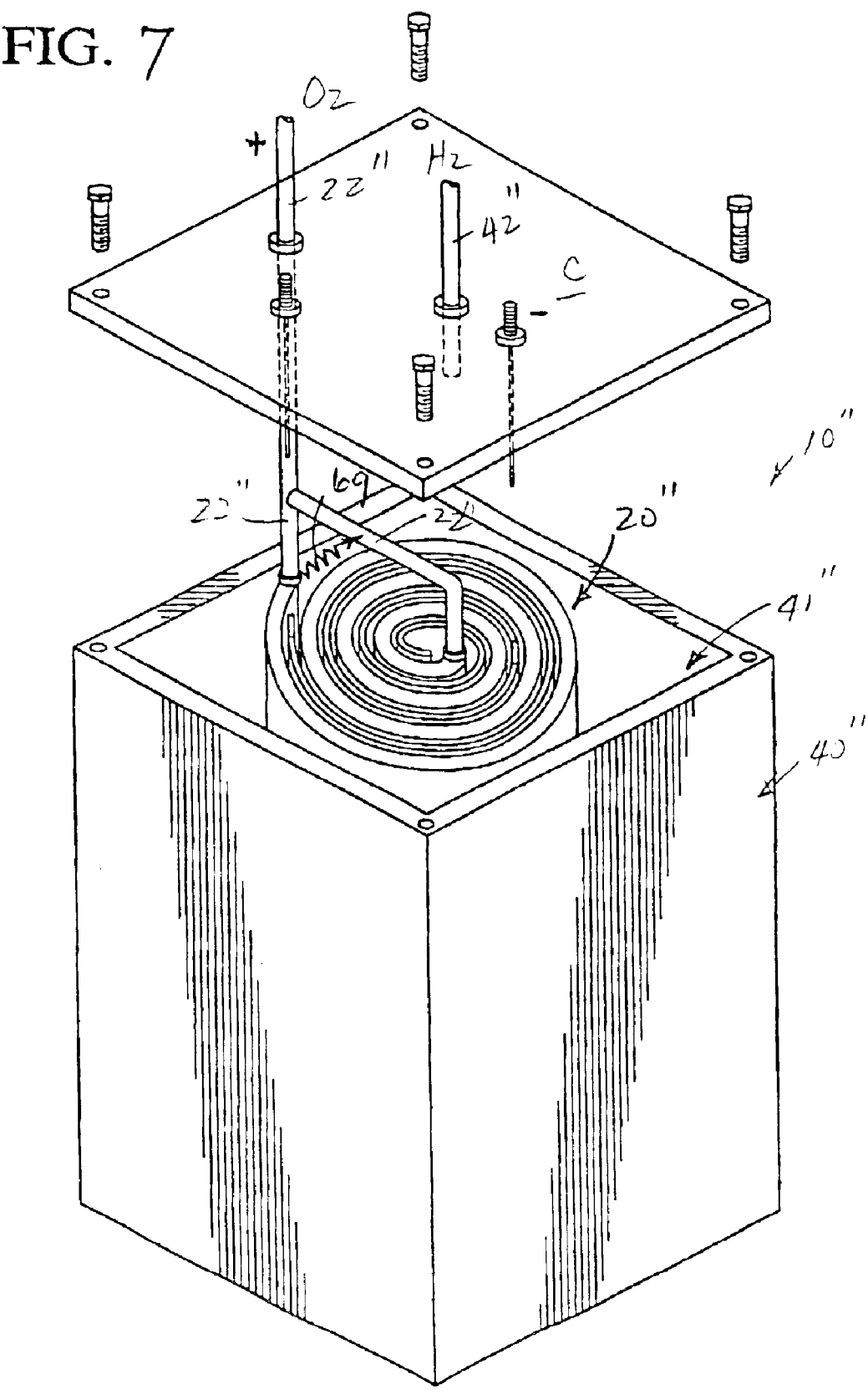
FIG. 7 is a perspective view of another apparatus for converting a fluid/liquid into two gasses, and illustrates one of the encapsulated electrodes of FIG. 1 and a non-encapsulated electrode defining an electrode couple formed into a substantially tight roll housed within a chamber of a container.

Reference is made to FIG. 7 of the drawings which illustrates another apparatus 10" for converting a fluid into at least two gasses through electrolysis, again water into oxygen and hydrogen, for example. The apparatus 10" includes an encapsulated electrode 20" which is identical to the electrode 20', except more flexible, and therefore double primed identical reference characters have been applied thereto. The apparatus 10" includes a housing 40" defining a chamber 41" which can be filled with water (not shown) and into which is immersed the encapsulated electrode 20" and an unencapsulated electrode 45" (FIG. 8), more flexible than the electrode 45, rolled end-to-end into intimate contiguous abutting relationship along the entire rolled length thereof. A flexible metallic tube 22", identical to the tube 22, feeds water into the interior of the envelope 30" and an end thereof is connected to a positive side of a conventional current source. One or more conventional tension springs 69 are connected at one end of the encapsulated electrode 20" to maintain the same intimately rolled in surface-to-surface contact throughout the length thereof and compensate for such variations as temperature, pressure or the like. An end of the tube 22" passes through a cover C which is conventionally secured to the housing 40" while another conduit 42" passes through the cover C and opens into the chamber 41. A negative side of a current path is connected to the unencapsulated electrode 45". Therefore, as electrolysis occurs during electron flow, oxygen bubbles are generated within the rolled encapsulated electron 20", specifically within the envelope 30", while hydrogen gas bubbles are generated on surfaces of the negatively charged electrode 45". The latter gasses are separately delivered via the conduits 22", 42", respectively, to storage facilities or for direct usage.

Another encapsulation system or encapsulated electrode 20''' is illustrated in FIG. 9 of the drawings and is identical to the system/encapsulated electrode 20' of FIGS. 1 through 3 and the rolled system 20" of FIGS. 7 and 8, and includes an encapsulated electrode 20''' defined by an encapsulation envelope 30''' and interiorly thereof a flexible porous sintered metallic electrode 25''' shown in partially fan-folded relationship to a flexible non-encapsulated metallic electrode 45'''. When completely fan-folded to an essentially flat configuration, opposing forces F''', such as springs made of electrically non-conductive material, can be utilized to hold folded portions in intimate substantially parallel side-by-side relationship for utilization within the apparatus 10 of FIG. 2 in the manner heretofore described to separately generate hydrogen and oxygen.

Figure 10:
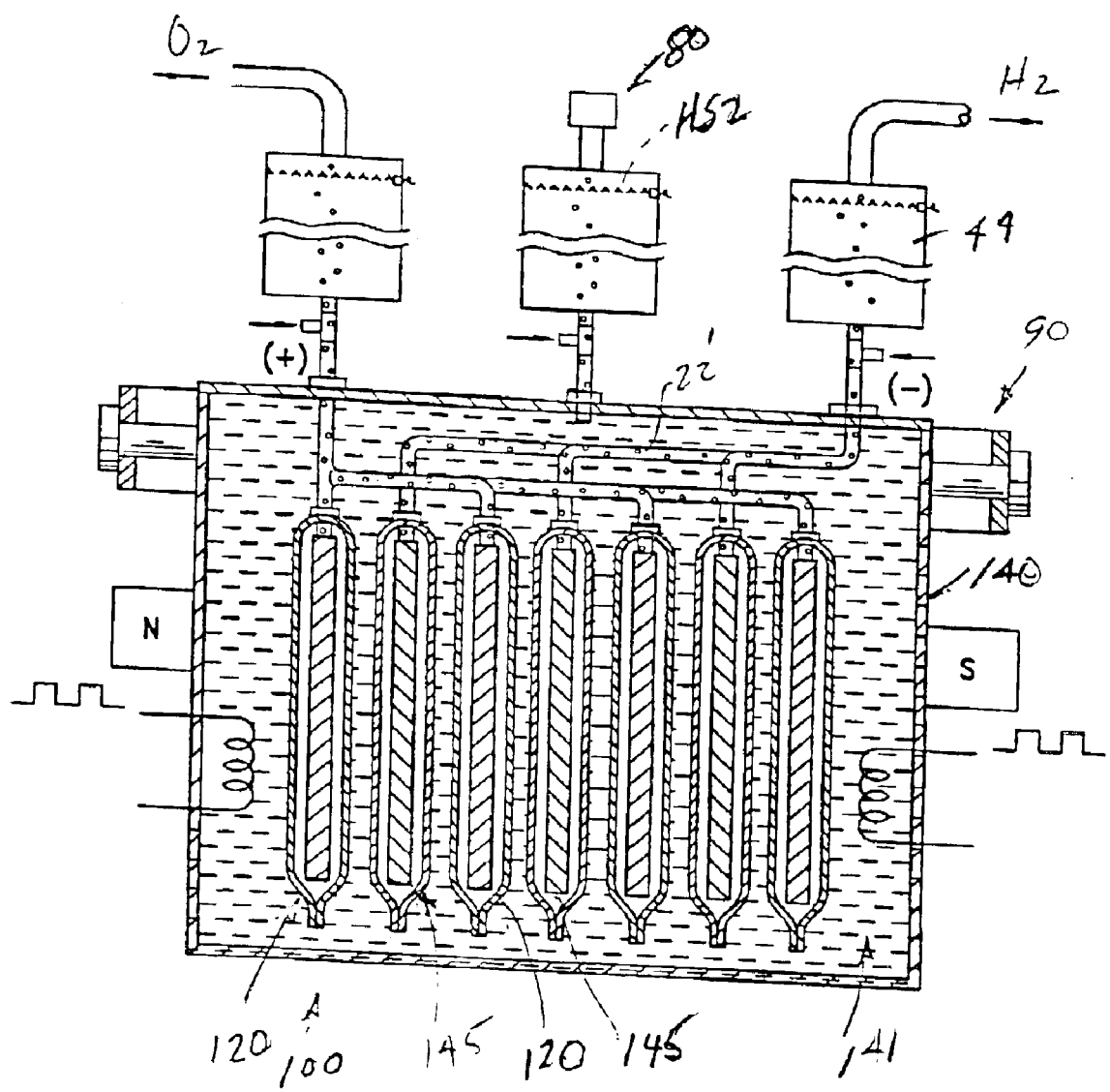
FIG. 10 is a diagrammatic view of another apparatus for converting fluid/liquid into at least two gasses, and illustrates a plurality of encapsulated electrodes alternately connected to opposite polarities of electric current, and a universal joint or gimbal for maintaining a housing containing fluid/liquid at all times horizontal.

Another apparatus 100, identical to the apparatus 10, is illustrated in FIG. 10 and includes an identical housing 140 defining a chamber 141 within which is housed encapsulated electrodes 120 and encapsulated electrodes 145 identical to the encapsulated electrodes and unencapsulated electrodes 20, 45, respectively, of FIG. 2. In FIG. 2 the hydrogen generated by the non-encapsulated electrodes 45 is collected in the chamber 41, whereas in FIG. 10 the hydrogen collected in the envelopes 145 is collectively directed via a conduit 22' to a storage tank 44' or a source of direct utilization. However, the apparatus 100 further includes two features beyond those described earlier with respect to the apparatus 10, namely, a flame-arrester 80 of a conventional construction and a universal joint or gimbal 90, also of a conventional construction. The flame-arrester 80 assures that any excess hydrogen in the interior of the headspace HS2 will be burnt off to prevent explosion/damage while the universal joint or gimbal 90 will allow the apparatus 100 to be housed within or upon a moving vehicle, such as a truck, automobile, boat or the like, and at all times maintain a substantially perfect horizontal attitude to assure that the hydrogen and oxygen bubbles are collected by substantially vertical upward flow.

Figure 11:
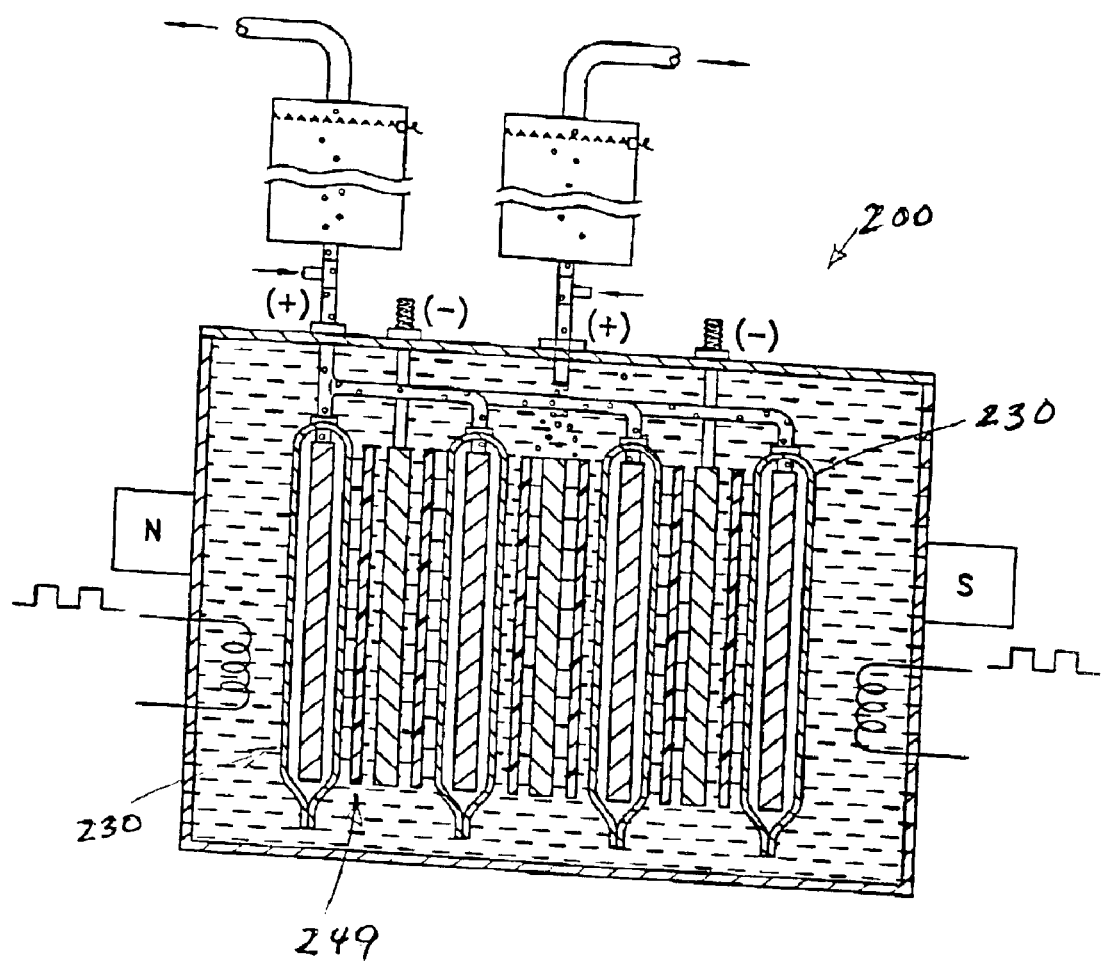
FIG. 11 is another diagrammatic view of an apparatus for converting a fluid/liquid into at least two gasses, and illustrates electrical insulation on opposite sides of non-encapsulated electrodes for preventing arcing between the latter and electrically conductive encapsulation envelopes of encapsulated electrodes.

Reference is made to FIG. 11 of the drawings in which another apparatus 200, substantially identical to the apparatus 10, is illustrated and includes like reference numerals applied thereto, prefixed by 200, to designated identical structure. As was noted earlier herein, the sheet or envelope 230 can be substantially non-conductive or relatively mildly conductive or conductive to whatever degree is necessary to assure efficient electrolysis depending upon operating parameters, including the particular liquid subject to the electrolysis. In cases where the electrical conductivity of the envelop 230 is relatively high, means 249 in the form of sheets of electrically insulating material in the form of an open polygonal frame are sandwiched between each encapsulated electrode envelope 230 and each unencapsulated electrode 245 to prevent arcing therebetween/thereacross.

Two other encapsulated electrodes 320 (FIGS. 12 and 13) and 420 (FIG. 14) are identical to the encapsulated electrode 20 except in the case of the encapsulated electrode 320 the flexible sheet or envelope 330 is formed of two separate sheets 330a, 330b heat-sealed by a heat seal 335 along all four sides thereof, as is best illustrated in FIG. 12. In addition, a metallic tube or conduit 322 and a solid electrical connector 323 corresponding to the respective metallic tube 22 and electrical connector 23 of FIG. 1 are connected to sides, rather than tops, of the electrode 325.

Figure 4:
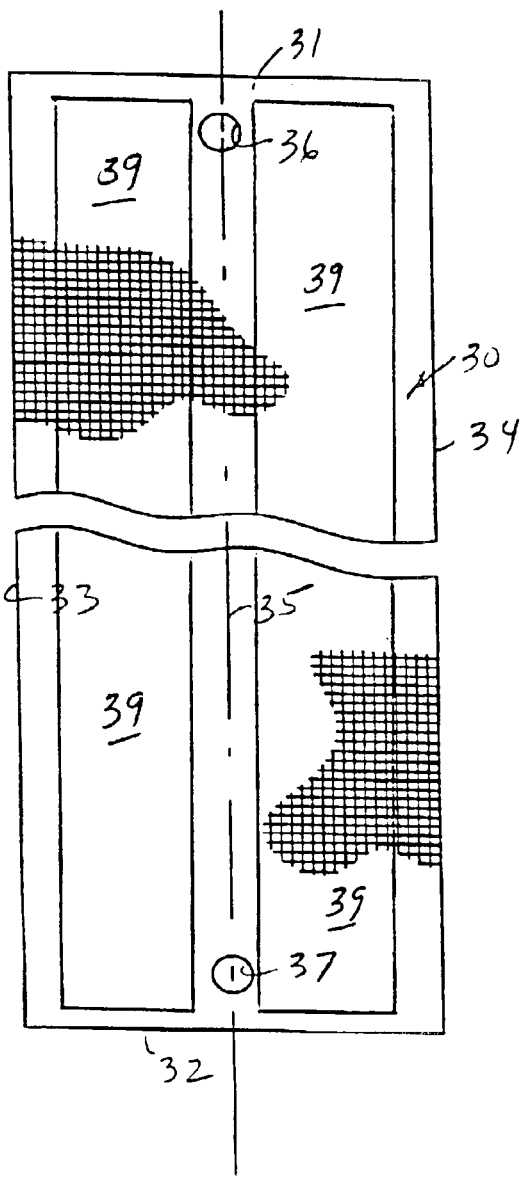
FIG. 4 is a fragmentary plan view of a sheet of flexible material from which the encapsulation envelope is formed, and illustrates two holes therein for receipt of the fluid inlet tube at one end and the electrical conductor/support at an opposite end of the encapsulated electrode.

The encapsulated electrode 420 includes an envelope 430, once again constructed from material identical to the sheet/envelope 30 of FIGS. 3 and 4, but is originally formed as a one-piece homogeneous extruded tube into which is axially slid a metallic porous electrode 425 having a tube or conduit 422 imbedded in either or both axially opposite ends of the porous electrode 425 and a support 423 corresponding in structure and function to the support 23 of the encapsulated electrode 20. Axially opposite ends of the tubular envelope 430 are each closed by heat seals 430a, 430b. The encapsulated electrodes 320, 420 are utilized in any of the apparatuses 10, 100, etc. or equivalents thereof to generate hydrogen and oxygen in the manner heretofore specifically described.

Figure 15:
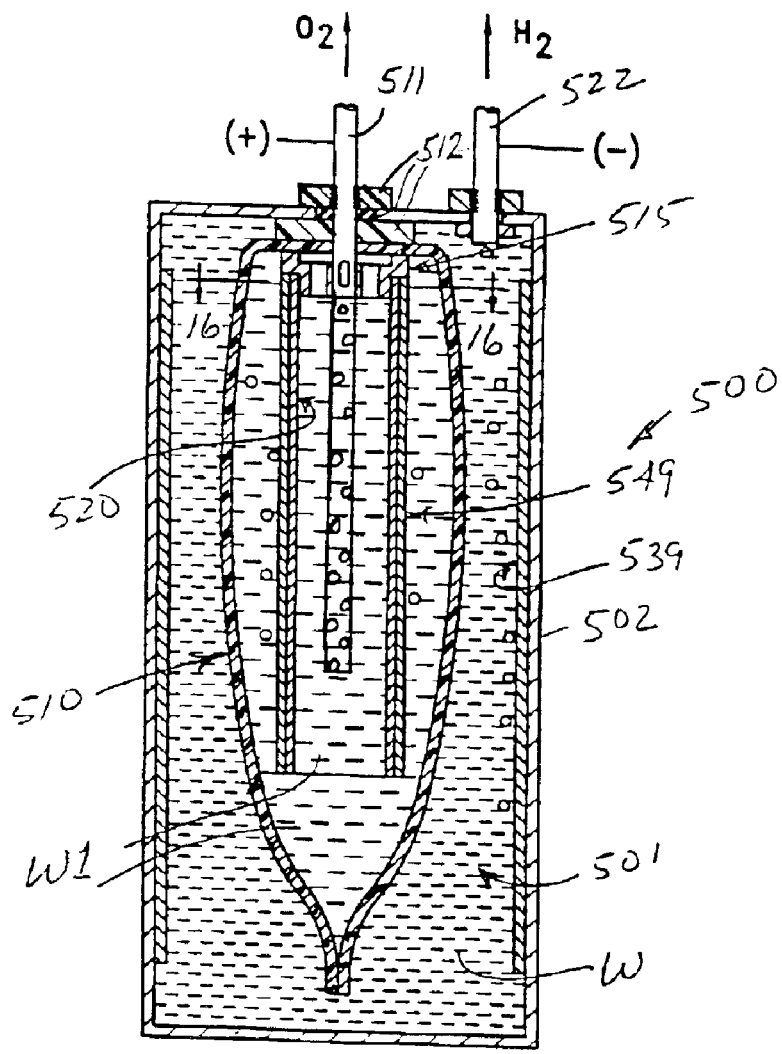
FIG. 15 is an axial cross-sectional view of another encapsulation system constructed in accordance with the invention, and illustrates a central tubular metallic electrode carrying an exterior catalyst coating housed within encapsulating means in the form of an envelope and an outermost metal housing having an interior wall provided with a catalyst coating.
Figure 16:
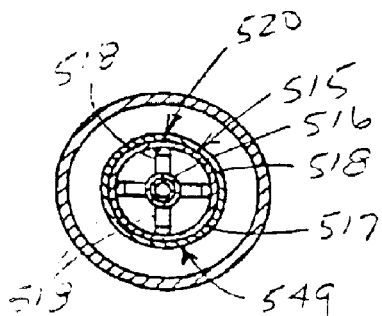
FIG. 16 is a cross-sectional view taken generally along line 16—16, and illustrates a spider housing a conduit for delivering water to the interior of the electrode and envelope and supporting an upper edge of the electrode in suspended relationship relative to the envelope.

Another apparatus constructed in accordance with this invention is illustrated in FIGS. 15 and 16, and includes means 500 in the form of a metallic housing, such as stainless steel or other conductive material, such as graphite, carbon, etc., defining an interior chamber 501 in which is housed an electrolyte, such as water W. An inner surface (unnumbered) of a cylindrical wall 502 of the housing 500 carries a catalyst coating 539, such as platinum.

Housed within the chamber 501 is encapsulation means 510 in the form of an envelope or tube manufactured in any of the various manners heretofore described and preferably constructed from Nafion® material. Water W1 or an equivalent electrolyte is housed within the envelope 510 and is delivered therein through a tube or conduit 511 which is connected to a positive electrical source (not shown) and is suitably insulated relative to the housing 500 by three electrical insulators, each being designated by the reference numeral 512. A lower end portion of the tube 511 is perforated for the escape of gas bubbles while an upper end portion has fixed thereto a spider 515 (FIG. 16) defined by an inner tubular portion 516, an outer tubular portion 517 and four legs 518. An upper end of a stainless steel tube 520 is suitably secured, as by welding, to the outer tubular portion 517 of the spider 515 and an exterior surface (unnumbered) of the tube 520, which constitutes an electrode, is covered by a catalyst coating 549, such as irridium. Another conduit or tube 522 is connected to a source of electrical energy and also to a source of the water W1. Upon subjecting the tubes or conductors 511, 522 to electrical energy, specifically creating positive and negative electrical terminals, long ionic chains are created in the encapsulating means or envelope 510 (Nafion®) resulting in the generation of oxygen $O_2$ within the encapsulating envelope 510 and hydrogen $H_2$ within the chamber 501 which rise as bubbles and pass through the respective conduits or tubes 511, 522 to sources of utilization or storage.

Figure 17:
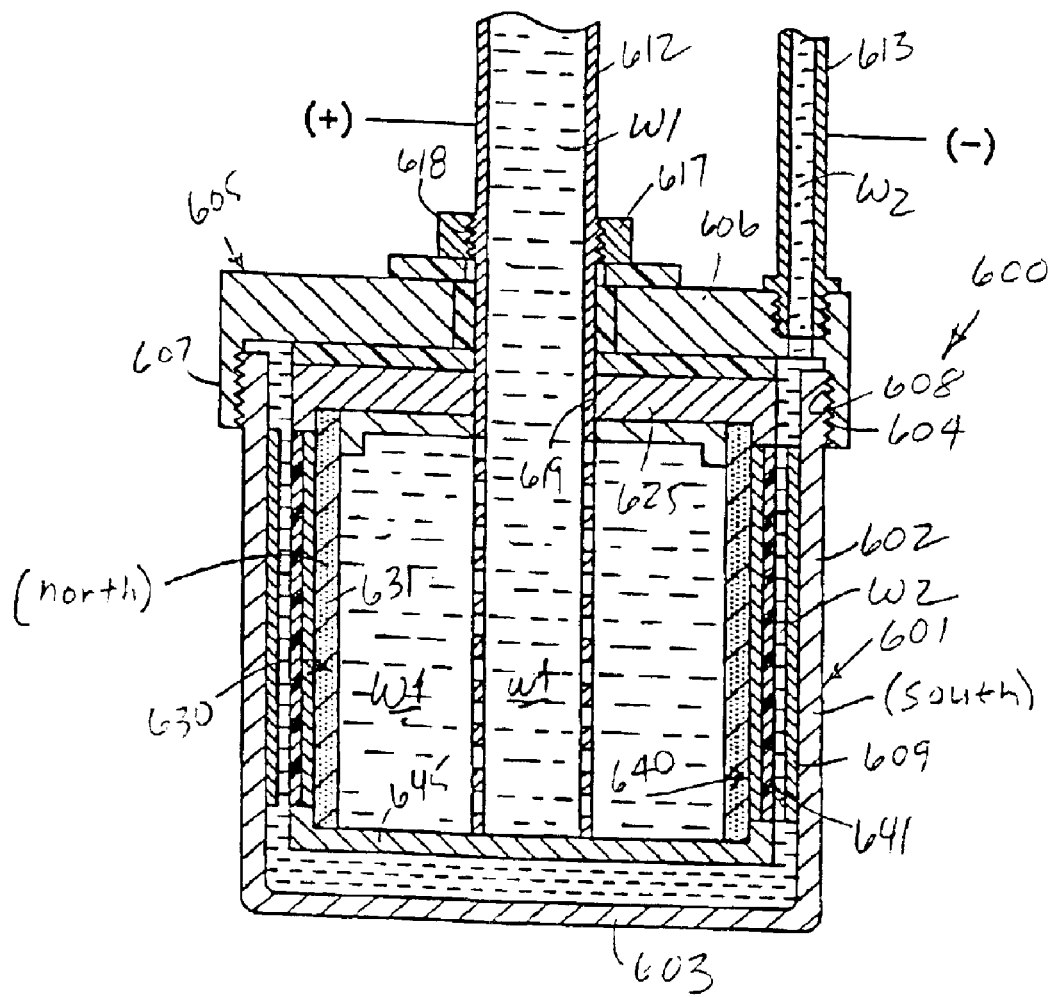
FIG. 17 is an axial cross-sectional view of another encapsulation system of the invention, and illustrates an outermost metal container having a cylindrical wall covered by a catalyst coating and an axial electrode having perforations at an end thereof opening into an interior container defined by a centered porous metal sleeve carrying exteriorily thereof an exterior catalyst coating and in turn being encapsulated by an encapsulation envelope.
Figure 18:
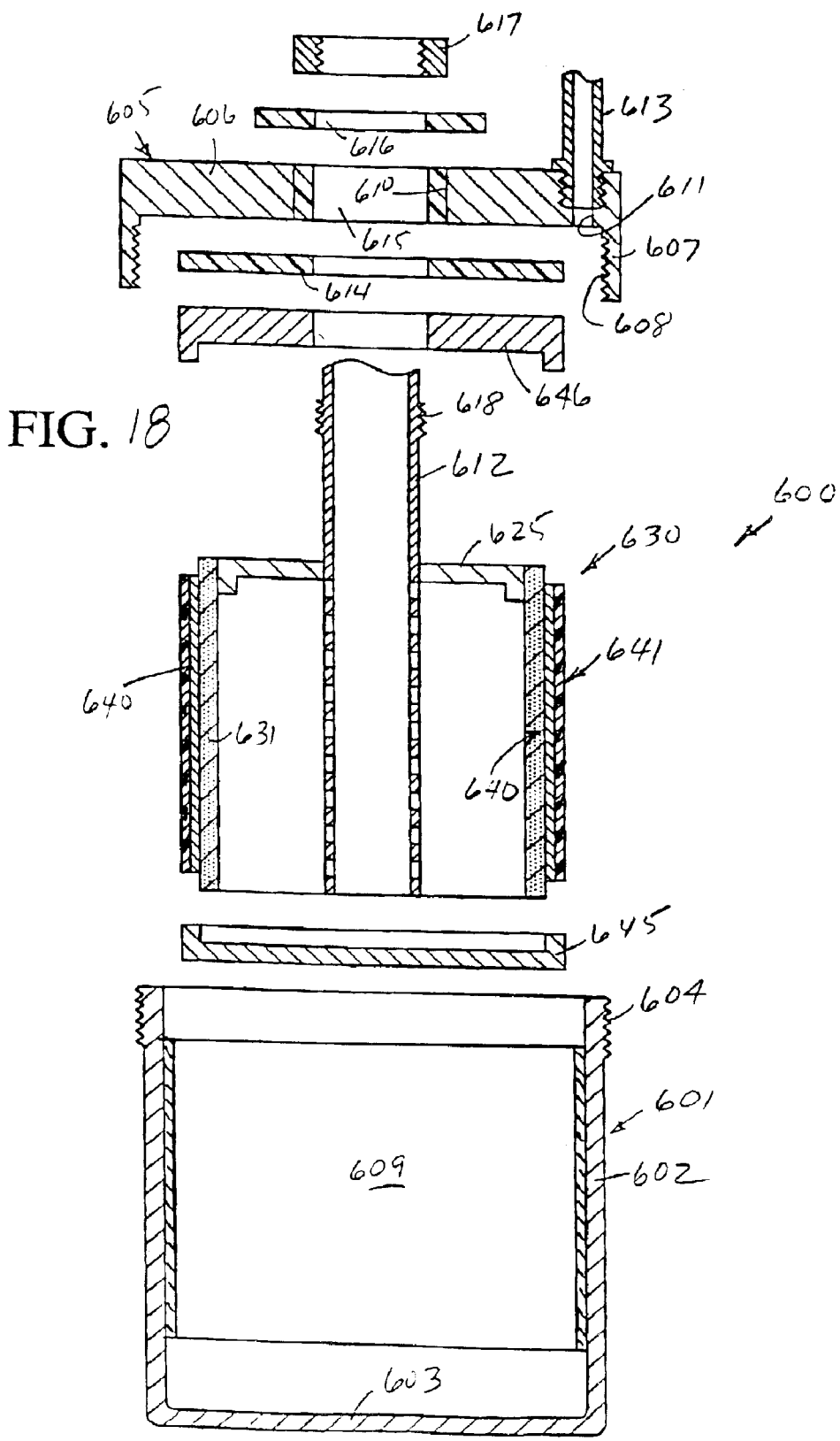
FIG. 18 is an axial cross-sectional view of the encapsulation system of FIG. 17, and illustrates the components thereof in exploded relationship prior to being assembled in the manner illustrated in FIG. 17.

Another apparatus or encapsulation or system 600 of the present invention is illustrated in FIGS. 17 and 18 of the drawings, and includes an outer housing 601 formed of metallic material, such as stainless steel, nickel or the like, but also can be magnetic material or coated with magnetic material for a purpose to be described hereinafter. The housing or container 601 includes a peripheral or cylindrical side wall 602, a bottom wall 603 and an open upper end carrying an external thread 604. An interior surface (unnumbered) of the side wall 602 is coated with a catalyst 609, such as platinum (FIG. 18). A cap 605 (FIG. 18) includes an end wall 606 and a peripheral wall 607 having an internal thread 608 which matches and can be secured to or removed from the thread 604 of the container 601. The end wall 606 of the cap 605 includes openings 610, 611 through which respectively passes and is secured a tube or conduit 612, 613, respectively. The tubes or conduits 612, 613 are connected to a positive and negative source, respectively, of electric energy. Electric insulators 614 through 616 insulate the positively charged conduit 612 from the negatively charged cap 605 and the negatively charged container 601 with a nut 617 being threaded to exterior threads 618 of the conduit 612 in the manner best illustrated in FIG. 17 of the drawings.

The conduit 612 passes through an opening 619 in an end cap 625 of an inner electrode 630 in the form of a cylindrical porous metal tube or sleeve 631 which also is preferably constructed from magnetic material. An upper edge portion (unnumbered) of the sleeve 631 is bonded or otherwise secured to a flange (unnumbered) of the end cap 625. A catalyst coating 640, such as irridium, is coated or otherwise applied to the exterior surface of the sleeve 631 of the inner electrode 630. Encapsulation means 641 in the form of an envelope, coating or the like of Nafion® embraces, coats and/or is in immediate intimate surface-to-surface contact with an exterior surface of the catalyst coating 640. A lower cap 645 and an upper cap 646 (FIG. 18) are bonded or otherwise secured to the respective lower and upper peripheral edges (unnumbered) of the metallic sleeve 631. Water W1 or an electrolyte is introduced into the interior of the sleeve 631 through the conduit 612 while water W2 is introduced into the container 601 and an area between the catalyst coatings 609 and the Nafion® membrane 641. When energized from a source of electrical energy to the polarities indicated in FIG. 17, oxygen ($O_2$) and hydrogen ($H_2$) bubble upwardly through the respective conduits 612, 613 to sources of utilization or storage in the manner heretofore described.

It should be particularly noted from FIG. 17 that the magnetic polarity [(north) & (south)] of each of the electrodes 631 and 601 correspond to the electrical charges [(+) & (−)] thereof because of the conductors 612, 613, respectively, being so charged. Thus, the electric current flow of the electric ions established by the electric current and the magnetic current flow are in the same direction, namely, positive to negative and north to south, respectively. In this fashion, the magnetic flow augments or increases the flow or travel of the electric ions resulting in an increase in the production of oxygen and hydrogen. The latter eventually depletes the magnetism of the magnetic material of the electrodes 630, 601, and preferably very strong permanent magnetic material should be used for the latter components, such as nickel plated rare earth or like permanent magnets or electromagents.

The utilization of magnets or magnetic material in the manner just described with respect to FIGS. 17 and 18 is equally applicable to the other encapsulating systems earlier described, specifically the encapsulation systems of FIGS. 1 through 3, 5 and 6, 7, 8 and 9, 10, 11, 12, 13, 14 and 15, 16.

Although a preferred embodiment of the invention has been specifically illustrated and described herein, it is to be understood that minor variations may be made in the apparatus without departing from the spirit and scope of the invention, as defined by the appended claims.

I claim:

1. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; and said encapsulating means being one of substantially conductive to ions and conductive to electrons and substantially non-porous to gas bubbles whereby ion or electron conduction between said at least one cathode and said at least one anode generates gas bubbles of a first gas and gas bubbles of a second gas within said respective chamber and encapsulating means.

2. The apparatus as defined in claim 1 wherein said at least one anode, said at least one cathode and said encapsulating means are in substantially parallel relationship to each other.

3. The apparatus as defined in claim 2 wherein said at least one cathode and anode in said chamber includes porous sintered metallic material, and said conducting means is a tube.

4. The apparatus as defined in claim 3 wherein said at least one cathode and anode in said chamber includes porous material.

5. The apparatus as defined in claim 2 wherein said at least one cathode and anode in said chamber includes porous sintered metallic material, and said conducting means is a tube having an end portion within said at least one cathode and one anode.

6. The apparatus as defined in claim 1 wherein said at least one anode, said at least one cathode and said encapsulating means are in substantially rolled relationship to each other.

7. The apparatus as defined in claim 6 wherein said at least one cathode and anode in said chamber includes porous sintered metallic material, and said conducting means is a tube.

8. The apparatus as defined in claim 7 wherein said at least one cathode and anode in said chamber includes porous material.

9. The apparatus as defined in claim 6 wherein said at least one cathode and anode in said chamber includes porous sintered metallic material, and said conducting means is a tube having an end portion within said at least one cathode and one anode.

10. The apparatus as defined in claim 1 wherein said at least one anode, said at least one cathode and said encapsulating means are in substantially spiral relationship to each other.

11. The apparatus as defined in claim 10 wherein said at least one cathode and anode in said chamber includes porous sintered metallic material, and said conducting means is a tube.

12. The apparatus as defined in claim 11 wherein said at least one cathode and anode in said chamber includes porous material.

13. The apparatus as defined in claim 10 wherein said at least one cathode and anode in said chamber includes porous sintered metallic material, and said conducting means is a tube having an end portion within said at least one cathode and one anode.

14. The apparatus as defined in claim 1 wherein said at least one anode, said at least one cathode and said encapsulating means are in substantially folded relationship to each other.

15. The apparatus as defined in claim 14 wherein said at least one cathode and anode in said chamber includes porous sintered metallic material, and said conducting means is a tube.

16. The apparatus as defined in claim 15 wherein said at least one cathode and anode in said chamber includes porous material.

17. The apparatus as defined in claim 14 wherein said at least one cathode and anode in said chamber includes porous sintered metallic material, and said conducting means is a tube having an end portion within said at least one cathode and one anode.

18. The apparatus as defined in claim 1 wherein said at least one anode, said at least one cathode and said encapsulating means are in substantially end-folded side-by-side parallel relationship to each other.

19. The apparatus as defined in claim 1 wherein said at least one anode, said at least one cathode and said encapsulating means are in substantially parallel folded relationship to each other.

20. The apparatus as defined in claim 1 wherein said encapsulating means is an envelope.

21. The apparatus as defined in claim 1 wherein said encapsulating means is a tube.

22. The apparatus as defined in claim 1 wherein said encapsulating means is an envelope sealed along at least one edge.

23. The apparatus as defined in claim 1 wherein said encapsulating means is an envelope folded to define at least one edge.

24. The apparatus as defined in claim 1 wherein said encapsulating means is an envelope folded to define at least one edge and sealed along at least one further edge.

25. The apparatus as defined in claim 1 wherein said encapsulating means is an envelope folded to define at least one edge and sealed along all remaining edges.

26. The apparatus as defined in claim 1 wherein said encapsulating means is a sheet of substantially flexible material folded along one edge and sealed along all remaining edges.

27. The apparatus as defined in claim 1 wherein said encapsulating means are two sheets of substantially flexible material sealed along adjacent peripheral edges.

28. The apparatus as defined in claim 1 wherein said at least one cathode and anode in said chamber includes porous material.

29. The apparatus as defined in claim 1 wherein said at least one cathode and anode in said chamber includes porous sintered material.

30. The apparatus as defined in claim 1 wherein said at least one cathode and anode in said chamber includes porous metallic material.

31. The apparatus as defined in claim 1 wherein said at least one cathode and anode in said chamber includes porous sintered metallic material.

32. The apparatus as defined in claim 1 wherein said at least one cathode and anode in said chamber includes porous sintered metallic material, and said conducting means is a tube.

33. The apparatus as defined in claim 1 wherein said at least one cathode and anode in said chamber includes porous sintered metallic material, and said conducting means is a tube having an end portion within said at least one cathode and one anode.

34. The apparatus as defined in claim 1 wherein said at least one cathode and anode in said chamber includes porous sintered metallic material, and said conducting means is a tube having a perforated end portion within said at least one cathode and one anode.

35. The apparatus as defined in claim 1 wherein said encapsulating means is a coating upon an exterior surface of said at least one cathode and one anode.

36. An apparatus for converting a fluid into at least two gases through electrolysis comprising means for defining a chamber adapted to house fluid, at least one cathode and one anode in said chamber, means for substantially entirely encapsulating one of said at least one cathode and said at least one anode; said encapsulating means being one of substantially conductive to ions and conductive to electrons and substantially impervious to gas bubbles whereby ion or electron conduction between said at least one cathode and said at least one anode generates gas bubbles of a first gas and gas bubbles of a second gas within said respective chamber and encapsulating means, and means for preventing electrical arcing across a space between an exterior of said encapsulating means and the at least one cathode and one anode outside and intimately adjacent said encapsulating means.

37. The apparatus as defined in claim 36 wherein said at least one anode, said at least one cathode and said encapsulating means are in substantially parallel relationship to each other.

38. The apparatus as defined in claim 36 wherein said encapsulating means is an envelope.

39. The apparatus as defined in claim 36 wherein said encapsulating means is a sheet of substantially flexible material folded along one edge and sealed along all remaining edges.

40. The apparatus as defined in claim 36 wherein said at least one cathode and anode in said chamber includes porous material.

41. The apparatus as defined in claim 36 wherein said at least one cathode and anode in said chamber includes porous sintered metallic material, and said conducting means is a tube.

42. The apparatus as defined in claim 36 wherein said at least one cathode and anode in said chamber includes porous sintered metallic material, and said conducting means is a tube having an end portion within said at least one cathode and one anode.

43. The apparatus as defined in claim 36 wherein said encapsulating means is a coating upon an exterior surface of said at least one cathode and one anode.

44. An apparatus for converting a fluid into at least two gases through electrolysis comprising means for defining a chamber adapted to house fluid, at least one cathode and one anode in said chamber, means for substantially entirely encapsulating one of said at least one cathode and said at least one anode; and said encapsulating means being substantially electro-chemically conductive to ions and substantially non-porous to gas bubbles whereby gasses are transmitted through long ionic chains through said encapsulating means for generating gas bubbles of a first gas and gas bubbles of a second gas within said respective chamber and encapsulating means.

45. The apparatus as defined in claim 44 wherein said at least one anode, said at least one cathode and said encapsulating means are in substantially parallel relationship to each other.

46. The apparatus as defined in claim 44 wherein said at least one anode, said at least one cathode and said encapsulating means are in substantially rolled relationship to each other.

47. The apparatus as defined in claim 44 wherein said at least one anode, said at least one cathode and said encapsulating means are in substantially spiral relationship to each other.

48. The apparatus as defined in claim 44 wherein said at least one anode, said at least one cathode and said encapsulating means are in substantially folded relationship to each other.

49. The apparatus as defined in claim 44 wherein said at least one anode, said at least one cathode and said encapsulating means are in substantially end-folded side-by-side parallel relationship to each other.

50. The apparatus as defined in claim 44 wherein said at least one anode, said at least one cathode and said encapsulating means are in substantially parallel folded relationship to each other.

51. The apparatus as defined in claim 44 wherein said encapsulating means is an envelope.

52. The apparatus as defined in claim 44 wherein said encapsulating means is a tube.

53. The apparatus as defined in claim 44 wherein said encapsulating means is an envelope sealed along at least one edge.

54. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; said encapsulating means being one of substantially conductive to ions and conductive to electrons and substantially non-porous to gas bubbles whereby ion electron conduction between said at least one cathode and said at least one anode generate gas bubbles of a first gas and gas bubbles of a second gas within said respective chamber and encapsulating means, and said encapsulated one of said at least one cathode and said at least one anode is an electrode having an exterior surface in substantially spaced relationship to said encapsulating means.

55. The apparatus as defined in claim 54 including a catalyst upon said exterior surface.

56. The apparatus as defined in claim 55 wherein said electrode is substantially tubular.

57. The apparatus as defined in claim 55 including another catalyst exterior of aid encapsulating means.

58. The apparatus as defined in claim 57 wherein said chamber defining means carries another catalyst in spaced relationship to said encapsulating means.

59. The apparatus as defined in claim 58 wherein said encapsulating means is a flexible envelope.

60. The apparatus as defined in claim 57 wherein said chamber defining means defines a housing having an interior surface, and another catalyst upon said interior surface.

61. The apparatus as defined in claim 60 wherein said encapsulating means is a flexible envelope.

62. The apparatus as defined in claim 55 wherein said chamber defining means carries another catalyst in spaced relationship to said encapsulating means.

63. The apparatus as defined in claim 55 wherein said chamber defining means defines a housing having an interior surface, and another catalyst upon said interior surface.

64. The apparatus as defined in claim 54 wherein said electrode is substantially tubular.

65. The apparatus as defined in claim 54 wherein said electrode is substantially cylindrical.

66. The apparatus as defined in claim 54 including another catalyst exterior of aid encapsulating means.

67. The apparatus as defined in claim 54 wherein said chamber defining means carries another catalyst in spaced relationship to said encapsulating means.

68. The apparatus as defined in claim 54 wherein said chamber defining means defines a housing having an interior surface, and another catalyst upon said interior surface.

69. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; and said encapsulating means being substantially conductive to ions and substantially non-porous to gas bubbles whereby ion exchange between said at least one cathode and said at least one anode generate gas bubbles of a first gas and gas bubbles of a second gas within said respective chamber and encapsulating means, and magnetic means for augmenting the exchange of ions between said cathode and anode.

70. The apparatus as defined in claim 69 wherein said magnetic means are at least one of a permanent magnet and an electromagnet.

71. The apparatus as defined in claim 69 wherein said magnetic means generate a magnetic field whose direction is additive to the predetermined direction of ion exchange between said at least one cathode and anode.

72. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; said encapsulating means being one of substantially conductive to ions and conductive to electrons and substantially non-porous to gas bubbles whereby ion or electron conduction flowing between said at least one cathode and said at least one anode generates gas bubbles of a first gas and gas bubbles of a second gas within said respective chamber and encapsulating means, and means along an exterior surface of at least one of said cathode and anode for facilitating the release of generated gas bubbles.

73. The apparatus as defined in claim 72 wherein said exterior surface means is a roughened exterior surface.

74. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; said encapsulating means being of a substantially conductive to ions and conductive to electrons and substantially non-porous to gas bubbles whereby ion or electron conduction between said at least one cathode and said at least one anode generates gas bubbles of a first gas and gas bubbles of a second gas within said respective chamber and encapsulating means, and means for supporting said housing for universal movement whereby gas bubbles will flow substantially vertically upwardly irrespective of the disposition of said housing.

75. An apparatus for converting a fluid into at least two gases through electrolysis comprising means for defining a chamber adapted to house fluid, at least one of a cathode and an anode in said chamber, means for substantially entirely encapsulating one of said at least one cathode and said at least one anode; said encapsulating means being, one of substantially conductive to ions and conductive to electrons and substantially non-porous to gas bubbles whereby ion or electron conduction between said at least one cathode and said at least one anode generates gas bubbles of a first gas and gas bubbles of a second gas within said respective chamber and encapsulating means, and first and second conducting means for conducting gas from said respective first-mentioned and second-mentioned encapsulating means.

76. The apparatus as defined in claim 75 wherein said at least one anode, said at least one cathode and said first-mentioned and second-mentioned encapsulating means are in substantially parallel relationship to each other.

77. The apparatus as defined in claim 75 wherein said at least one anode, said at least one cathode and said first-mentioned and second-mentioned encapsulating means are in substantially rolled relationship to each other.

78. The apparatus as defined in claim 75 wherein said at least one anode, said at least one cathode and said first-metnioned and second-mentioned encapsulating means are in substantially spiral relationship to each other.

79. The apparatus as defined in claim 75 wherein said at least one anode, said at least one cathode and said first-mentioned and second-mentioned means are in substantially folded relationship to each other.

80. The apparatus as defined in claim 75 wherein said first-mentioned and second-mentioned encapsulating means are each an envelope.

* * * * *